(12) United States Patent
King et al.

(10) Patent No.: US 7,220,177 B2
(45) Date of Patent: May 22, 2007

(54) FISH STUNNING APPARATUS

(75) Inventors: Graeme Neville King, Cleveland (AU); Bruce Goodrick, Sheldon (AU)

(73) Assignee: Seafood Innovations Pty. Ltd., Sheldon, Queensland (AU)

( * ) Notice: Subject to any disclaimer, the term of this patent is extended or adjusted under 35 U.S.C. 154(b) by 6 days.

(21) Appl. No.: 10/537,013

(22) PCT Filed: Dec. 3, 2003

(86) PCT No.: PCT/AU03/01615

§ 371 (c)(1),
(2), (4) Date: Mar. 16, 2006

(87) PCT Pub. No.: WO2004/049810

PCT Pub. Date: Jun. 17, 2004

(65) Prior Publication Data
US 2006/0194531 A1    Aug. 31, 2006

(30) Foreign Application Priority Data
Dec. 3, 2002    (AU)    .............................. 2002953070

(51) Int. Cl.
*A22B 3/02*    (2006.01)
(52) U.S. Cl. ...................................................... 452/62
(58) Field of Classification Search ............ 452/52–54, 452/56–62, 65–68, 166, 196, 161, 120–123
See application file for complete search history.

(56) References Cited

U.S. PATENT DOCUMENTS

| | | | | |
|---|---|---|---|---|
| 4,780,932 A | * | 11/1988 | Bowman et al. ............... | 452/54 |
| 5,103,767 A | * | 4/1992 | Haugland et al. ............ | 119/215 |
| 5,692,951 A | * | 12/1997 | Huff .............................. | 452/62 |
| 5,980,376 A | * | 11/1999 | Grosseholz et al. ......... | 452/116 |
| 6,001,011 A | * | 12/1999 | Johnson ........................ | 452/65 |
| 6,183,356 B1 | * | 2/2001 | Middleton et al. ............ | 452/57 |
| 6,769,976 B2 | | 8/2004 | Bass | |

FOREIGN PATENT DOCUMENTS

| | | |
|---|---|---|
| JP | 2002345396 A | 12/2002 |
| WO | 199844805 A | 10/1998 |
| WO | 199946997 A | 9/1999 |

* cited by examiner

Primary Examiner—Thomas Price
(74) Attorney, Agent, or Firm—Brooks Kushman P.C.

(57) ABSTRACT

A fish stunning apparatus comprising a fish stunning device (100) including a striker (400); said striker (400) including a cylinder and a piston (443), said piston (443) movable between a retracted position and an extended position; a fish guide (200) having an entrance (230) and an exit (240); said fish guide (200) guiding a fish below said striker (400) so that said piston (443) contacts said fish when said piston (443) is in the extended position; trigger (300) to cause said piston (443) to be moved from the retracted position to the extended position when said fish is passed through said fish guide (200); wherein said fish is moved unidirectionally from said entrance (230) through said guide (200) to the exit (240). A fish guide (200) comprising an entrance (230), an exit (240) and a pivotally movable floor (220) and a table for distributing fish for stunning are also disclosed.

21 Claims, 15 Drawing Sheets

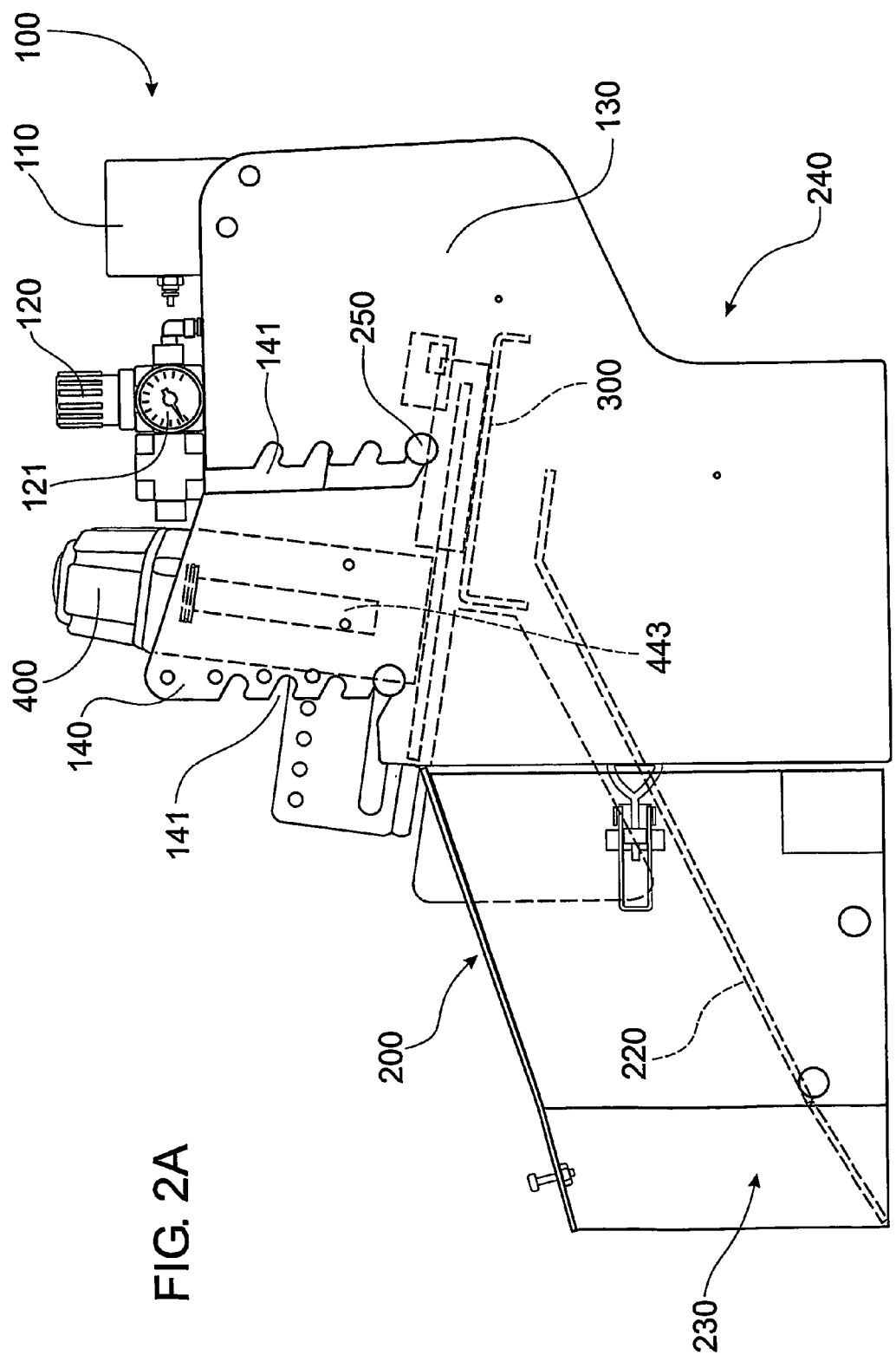

FISH STUNNING APPARATUS

FIELD OF THE INVENTION

This invention relates to a fish stunning apparatus. In particular, the invention relates to a fish stunning apparatus including a fish stunning device, a fish guide and/or a fish delivery table.

BACKGROUND OF THE INVENTION

It has be found that by stunning fish, the quality of the flesh of the fish is increased as death does not induce the creation of lactic acid in the flesh of the fish. Fish are stunned in a number of ways including the most basic method of hitting the fish with a bat to using more complex devices in which the fish are stunned using a pneumatically driven ram.

In most commercial operated fisheries more complex pneumatic rams are used as they are more efficient and less physically demanding on an operator. An example of a fish stunning device that uses a pneumatic ram is disclosed in International Patent Application No WO 01/97621.

When fish are harvested, they are located in a holding area and then pumped onto a table. The fish are grabbed by an operator and stunned usually using a pneumatically driven stunning device that is mounted to the table. A guide is used to guide the head of the fish into the stunning device to activate a trigger to cause the pneumatic ram to be extended and stun the fish. The fish is then withdrawn from the guide and passed further along the table for other operations such as bleeding.

A problem with this process is that often the fish are pumped onto the table in waves. A large number of fish are often located on the table at one time creating a backlog of fish. An operator that uses the fish stunning apparatus shown in WO 01/97621 must push the fish forwardly through the guide in order to stun the fish. The difficulty arises when the fish must be removed as the backlog often hinders or sometimes prevents the removal of the fish. Further, as there is a passageway that must be provided to allow fish to be passed further along the table, fish that have not been stunned can be passed through this passageway which is undesirable.

OBJECT OF THE INVENTION

It is an object of the invention to overcome or alleviate the above disadvantages or provide the consumer with a useful or commercial choice.

SUMMARY OF THE INVENTION

A fish stunning apparatus comprising:
a fish stunning device including a striker; said striker including a cylinder and a piston, said piston movable between a retracted position and an extended position;
a fish guide having an entrance and an exit; said fish guide guiding a fish below the striker so that the piston contacts said fish when the piston is in the extended position;
a trigger to cause the piston to be moved from the retracted position to the extended position when the fish is passed through the fish guide;
wherein a fish is moved unidirectionally from the entrance through the guide to the exit.

The fish stunning device may be mounted to the fish guide using a mount.

The striker may include a head, a main body and a foot.

The cylinder may be located within the main body. The piston may be made integrally formed.

The main body may include a low-pressure chamber that is linked to a low-pressure inlet port and a high-pressure chamber that is linked to a high-pressure inlet port.

The head may include a control chamber that is linked to a control port. A control piston valve may be mounted within the head and may be movable between a striker position and a non-striker position.

An outlet port may be above the control piston valve to allow air to pass out of the head.

A passage way may extend through control piston valve to allow air to pass from the cylinder out the outlet.

A seal may be located above the passageway to seal the passageway when the control piston valve is in the striker position.

The foot has an aperture through which the piston extends when in the extended position.

A fish guide for guiding fish below a stunning device; said fish guide comprising:
an entrance for allowing fish to pass into the device;
an exit to allow fish to pass from the device;
a floor being pivotally movable between an first position and a second position;
wherein the floor moves from the first position to the second position to allow a fish to pass from the entrance to the exit.

The entrance and exit may be formed by a pair of side walls. The side walls may be diverging.

The floor may be pivotally movable using a mechanical device. The mechanical device may be at least one ram. The ram may be pneumatically driven.

A mounting means may be provided on the fish guide for mounting a fish stunning device thereto. The mounting means may be pins located on the side walls.

A table for distributing fish for stunning, said table comprising:
a reservoir for holding fish and water;
an inlet to introduce fish into the reservoir;
a weir to allow fish to pass from said reservoir;
a slide to distribute fish after they pass from the weir; and
a water flow device to add water to the reservoir
wherein the water flow device is orientated to add water in a direction away from the weir.

Preferably, the table also includes a drain to drain water that passes over the weir from the reservoir.

BRIEF DESCRIPTION OF THE DRAWINGS

Embodiments, by way of example only, will be described with reference to the accompanying drawings in which:

FIG. 2A is a side view of the fish stunning apparatus according to FIG. 1;

DETAILED DESCRIPTION OF THE PREFERRED EMBODIMENT

Figure 1:
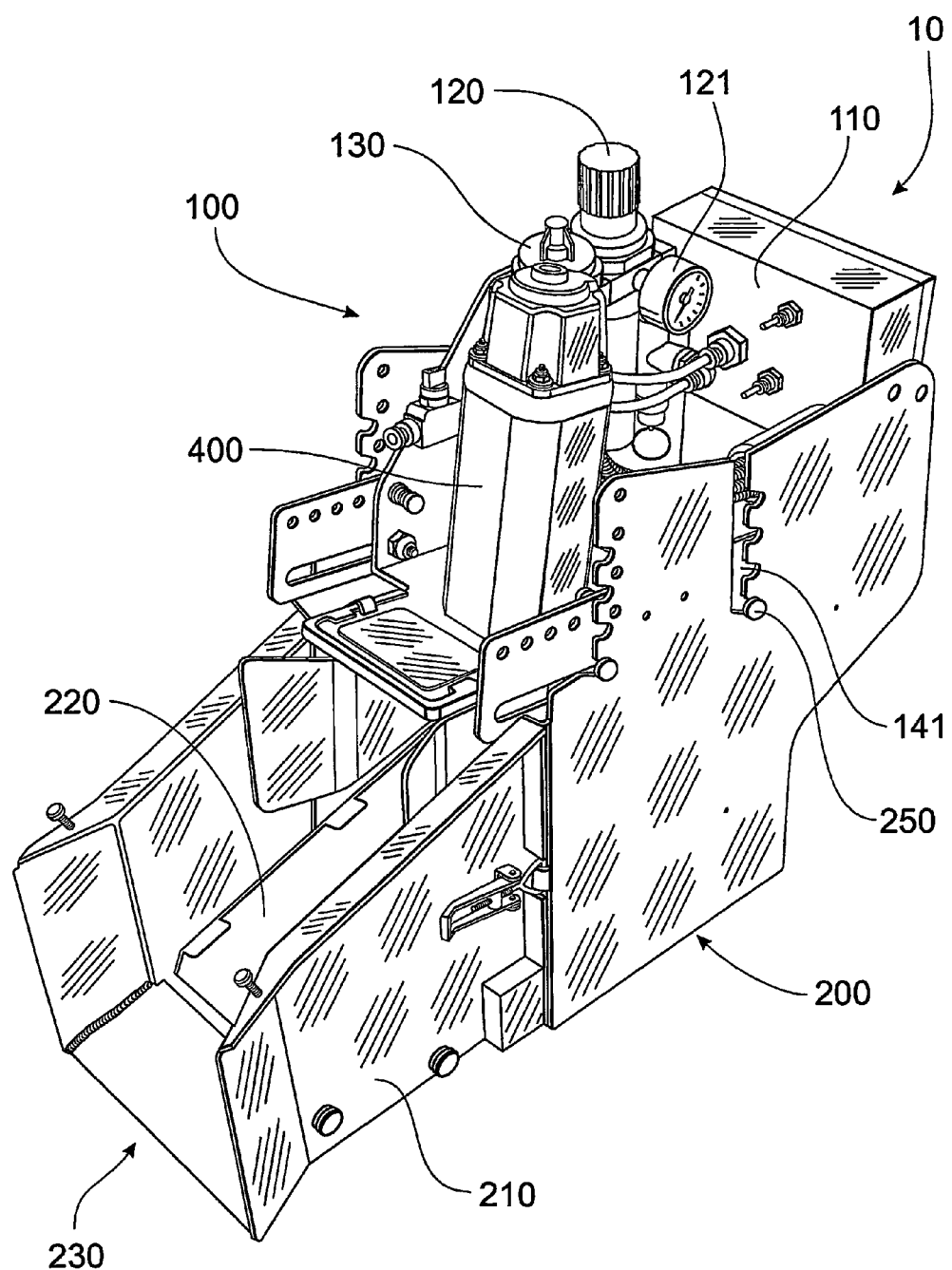
FIG. 1 is a perspective view of a fish stunning apparatus according to an embodiment of the invention.
Figure 2B:
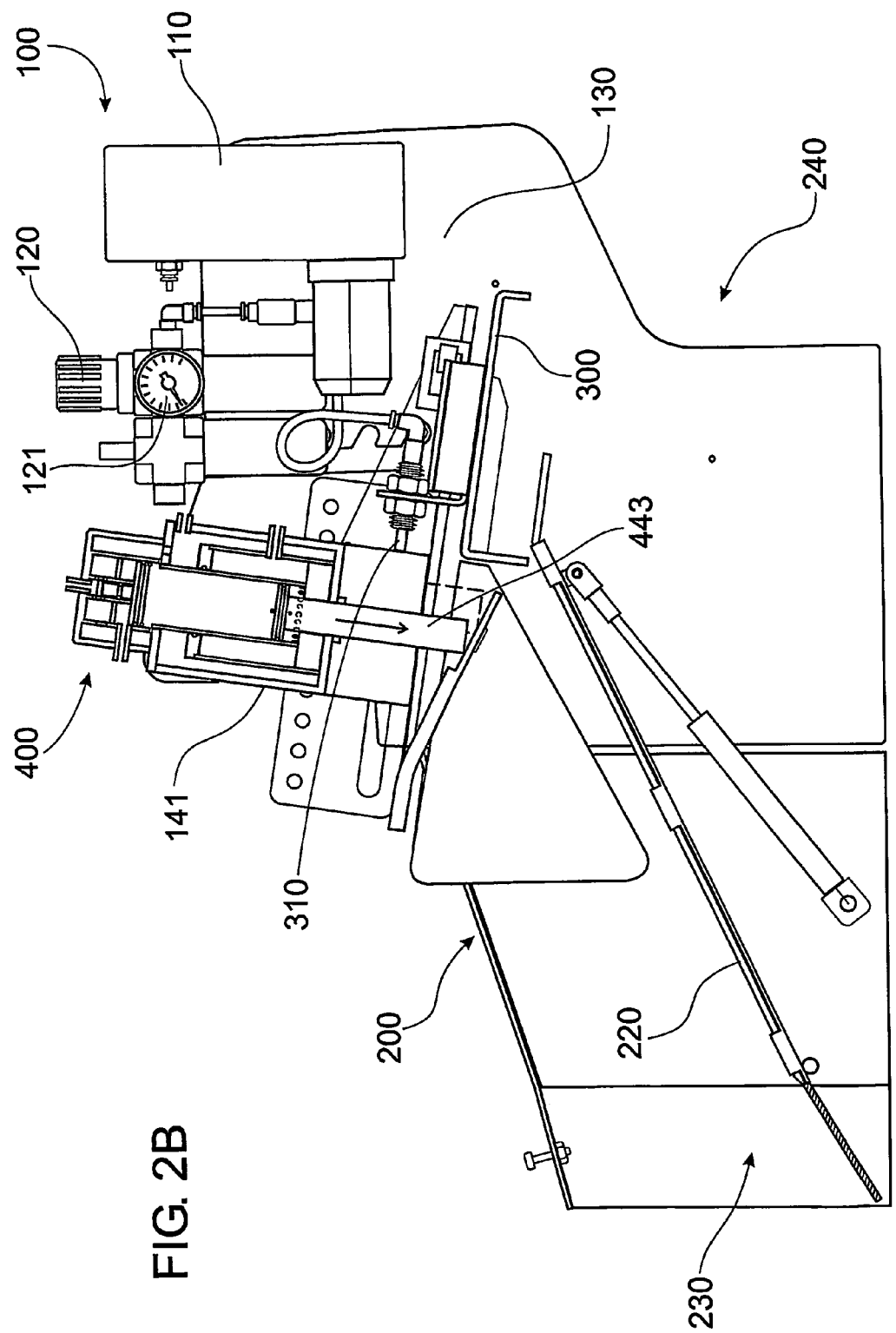
FIG. 2B is a partial side sectional side view of the fish stunning apparatus according to FIG. 1.

FIGS. 1, 2A and 2B show a fish stunning apparatus 10 including a fish stunning device 100, a fish guide 200 and a trigger 300.

The fish stunning device 100 is mounted to the top of the fish guide 200. The fish stunning device 100 includes a striker 400, a control box 110, a regulator 120 and an oiler 130 that are all mounted to a mount 140.

The fish guide 200 includes a pair of side walls 210 and a pivotally mountable floor 220. A front of the side wall defines an entrance 230 into which fish are passed and a back of the guides defines an exit 240 from which the fish are passed.

The fish stunning device 100 is mounted to the top of the fish guide using the mount 140 and pins 250 that are located on the side walls of the fish guide. The fish guide 200 include slots 141 that are able to be used to adjust the height of the striker 400 relative to the floor 220.

The floor 220 is pivotally movable between a first position where the fish is located through the entrance 230 within the guide to be stunned and a second position where the fish is passed from the guide through the exit of the guide 240.

The floor 220 is moved between the first and second position using a pair of pneumatic rams 260 connected to the underside of the floor 220.

The trigger 300 is mounted adjacent the striker 400. The trigger 300 is operatively connected to striker 400 and the floor 220. A pin pneumatic ram 310 is connected to the trigger 300 to ensure that the trigger is fully engaged when activated.

The striker 400, shown in more detail in FIGS. 3A to 3D, is formed from a head 420, a main body 440 and a foot 460.

A pneumatic ram 441 is located within the main body 440 that includes a cylinder 442 and a piston 443 that is reciprocatable within the cylinder 442. The piston 443 is made from a single piece of plastics that is easily removable and difficult to break. An O-ring 445 provides a seal between the cylinder 442 and the piston 443. The piston 442 is movable between an extension position and retraction position.

The main body 440 also includes a low-pressure chamber 446 that is linked to a low-pressure inlet port 447 and a high-pressure chamber 449 that is linked to a high-pressure inlet port 448.

The cylinder 442 is in fluid communication with the low-pressure chamber via a ring of holes 450 located at the bottom of the cylinder 442. Two additional holes 451 located at the bottom of the cylinder 442 are also in fluid communication with the low-pressure chamber 446.

The high-pressure chamber 449 extends into the head 420 of the striker 400 via an aperture 452 in the main body 440.

The head 420 includes a control chamber 421 that is linked to a control port 422. A control piston valve 423 is reciprocately mounted within the head 420 and movable between a striker position and a non-striker position. The pressure located within the control chamber 421 controls the movement at the control piston valve 423 between the striker and non-striker positions.

An outlet port 424 is located above the control piston valve 423 and allows air to pass from the head 420. A passageway 425 extends through control piston valve 423 to allow air to pass from the cylinder out the outlet port 424. A seal 426 is located above the passageway 425 to seal the passageway 425 when the control piston valve 423 is in the striker position.

The foot 460 has an aperture 461 through which the piston 443 extends when in the extended position. A Teflon, self-lubricating washer 462 is located within the foot to allow smooth reciprocation of the piston.

Figure 3A:
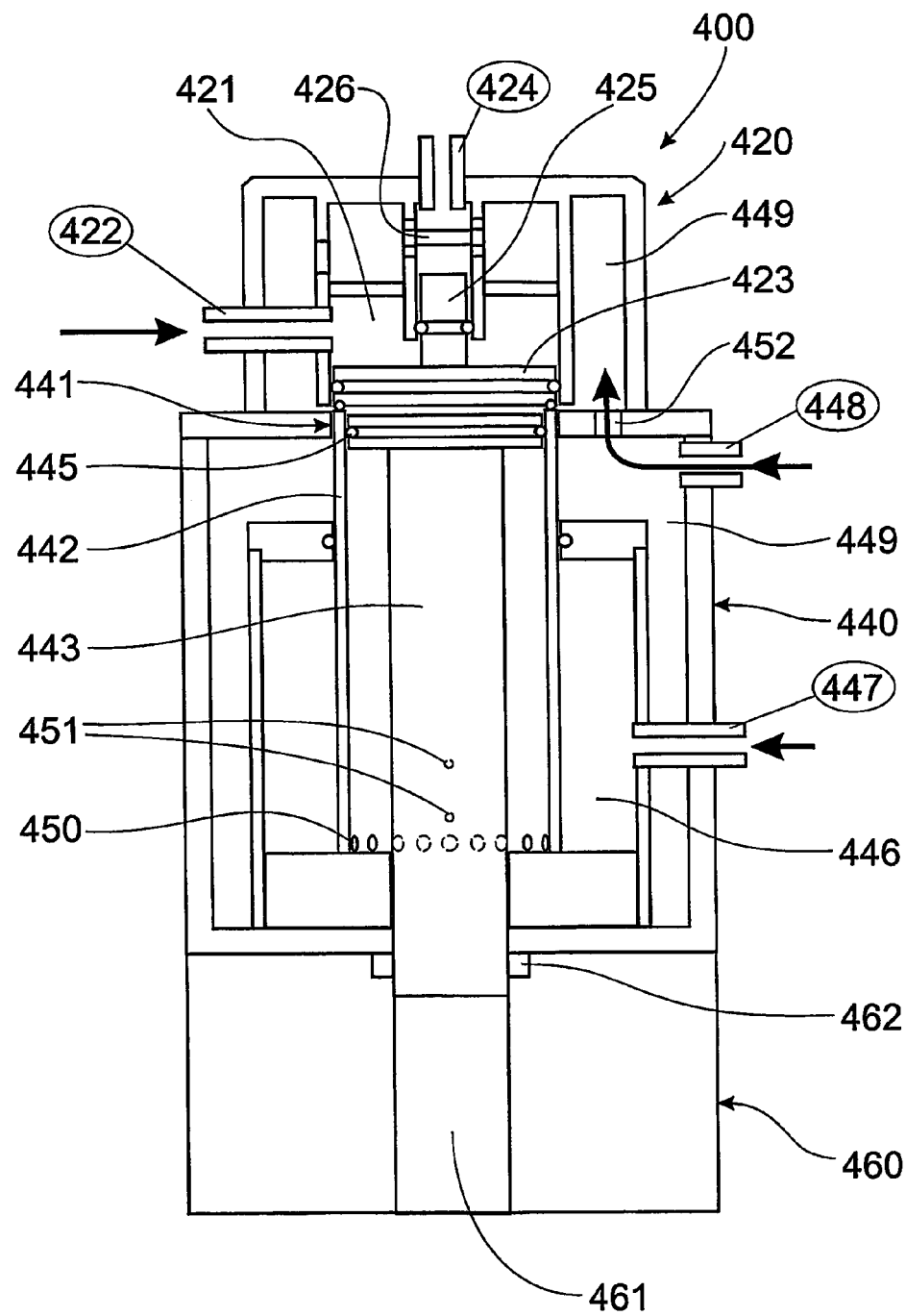
FIG. 3A is a side sectional view of a striker in a first position.

The striker operates in the following manner. The piston 443 starts in the retracted position with the control piston valve 423 in the non-striker position as shown in FIG. 3A. The control piston valve 423 is held in the non-striker position by high-pressure air that is fed through the control port 422.

Figure 3B:
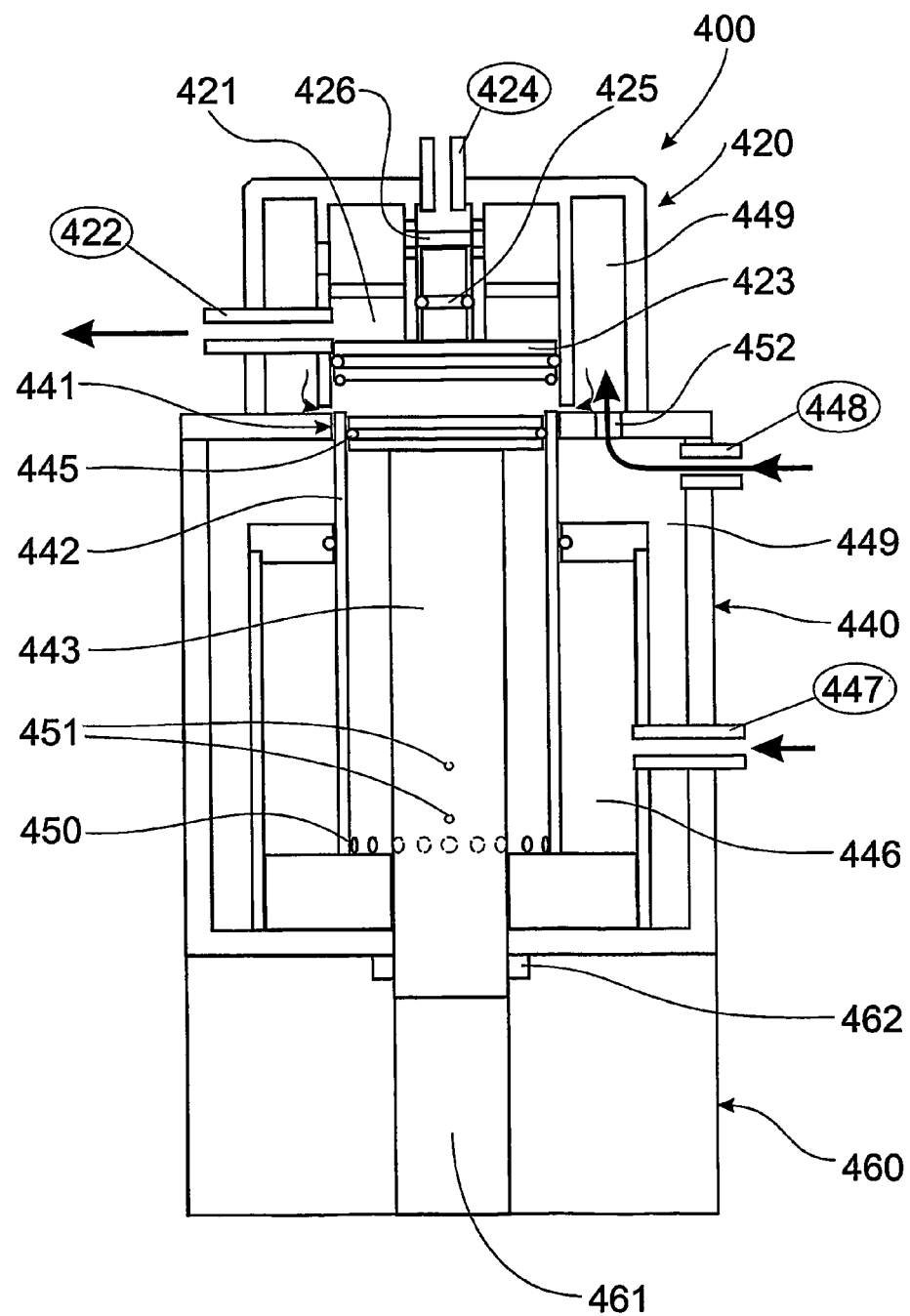
FIG. 3B is a side sectional view of the striker in a second position.
Figure 3C:
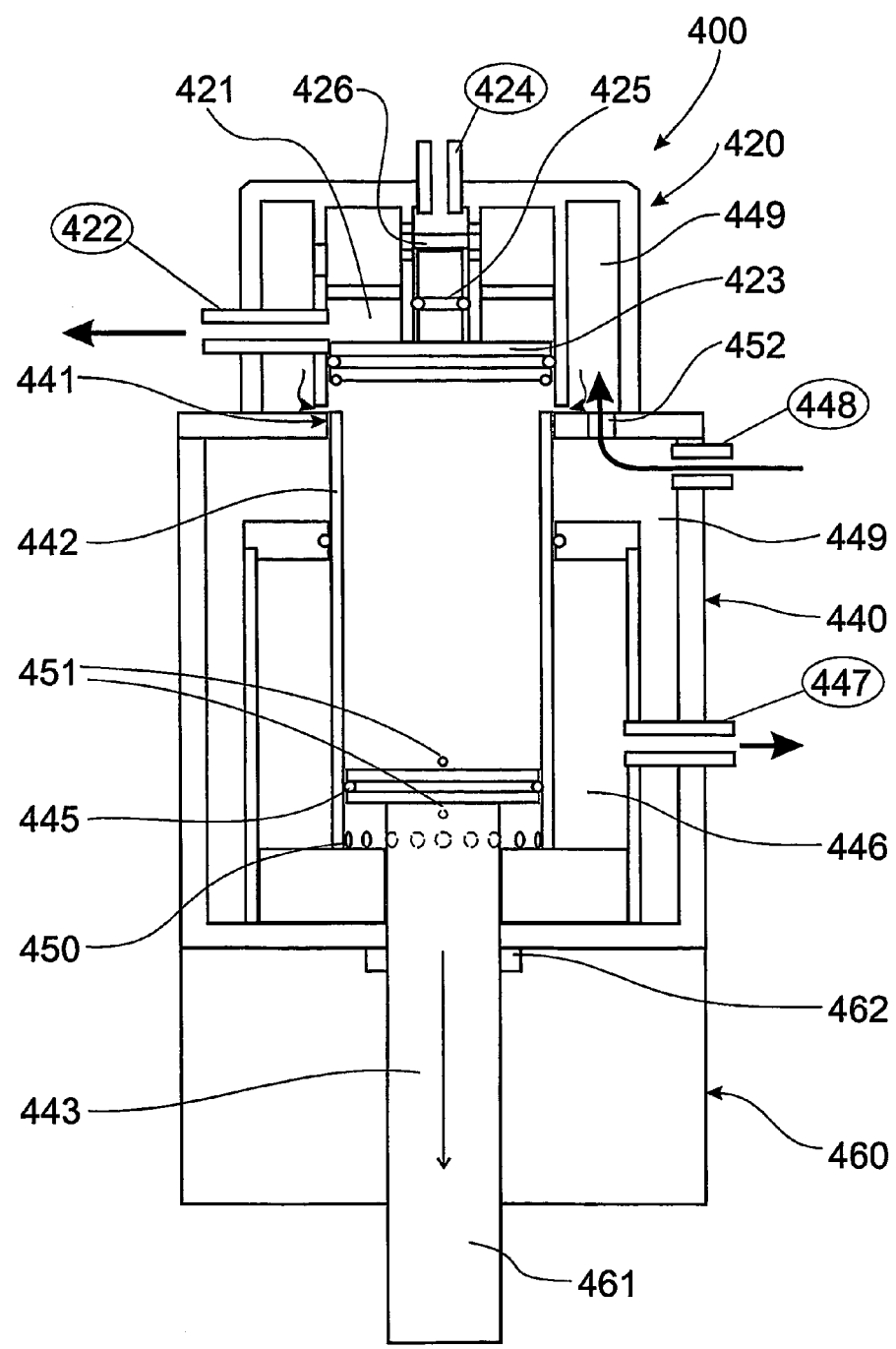
FIG. 3C is a side sectional view of the striker in a third position.

The control port 422 is opened to allow pressure to be released from the control chamber 421 as shown in FIG. 3B. This allows the control piston valve 423 to move into the striker position where the passageway 425 is sealed against the seal 426. High-pressure passes from the high-pressure chamber 449 into the cylinder 442 to cause the piston 443 to be moved to the extended position as shown in FIG. 3C. Air located within the cylinder 442 is passed out of the inlet port 447 when the piston 443 travels down the cylinder 442.

When the piston 443 is close to the bottom of the cylinder 442, air is passed through two holes 451 located within the cylinder 442. This causes high-pressure air to be passed from within the cylinder 442 into the low-pressure chamber 446.

Figure 3D:
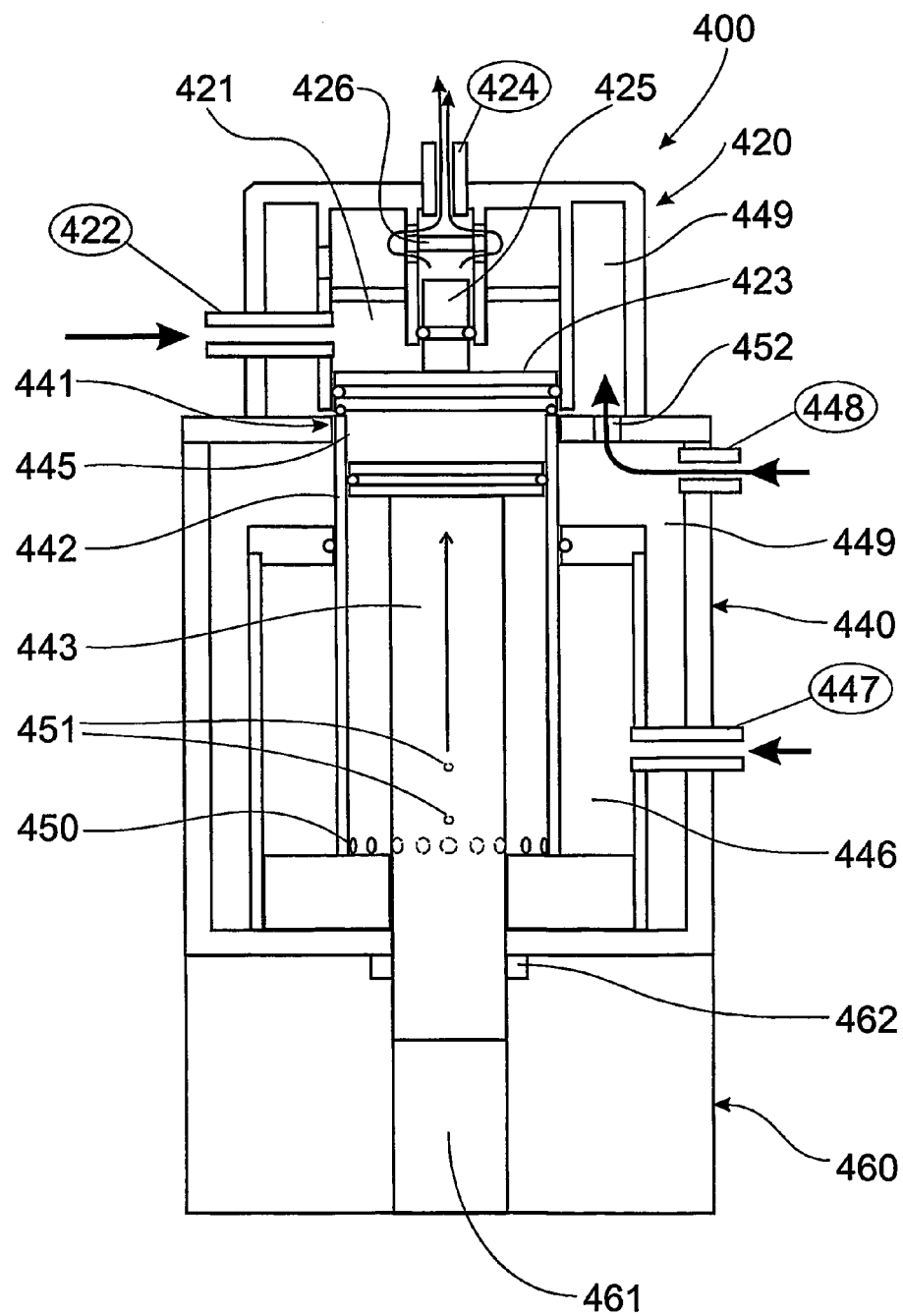
FIG. 3D is a side sectional view of the striker in a fourth position.
Figure 4A:
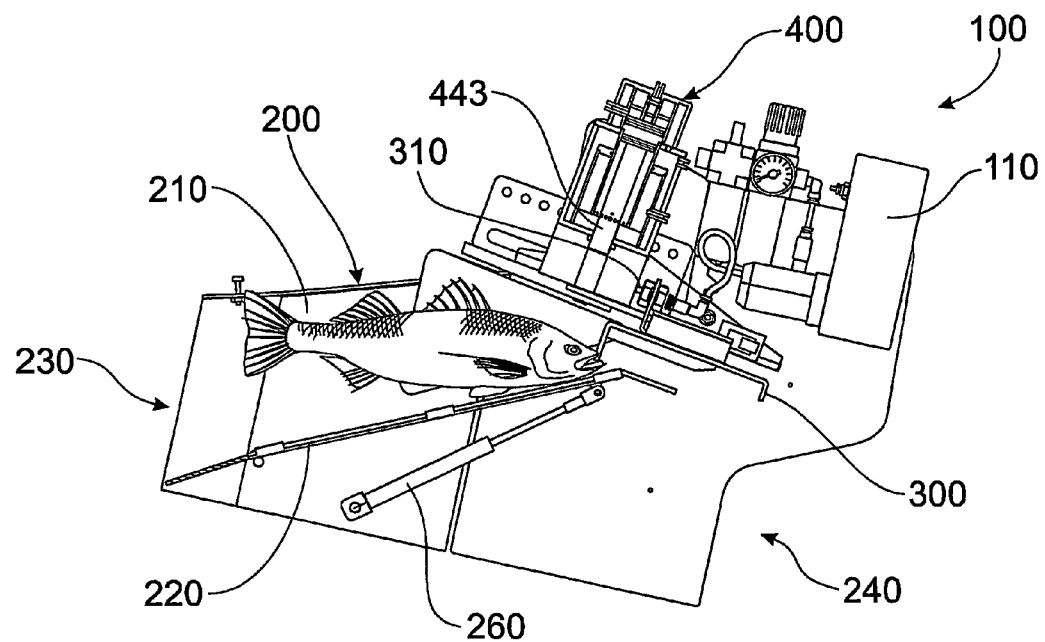
FIG. 4A is a side sectional view of the fish stunning apparatus in a first position.
Figure 4B:
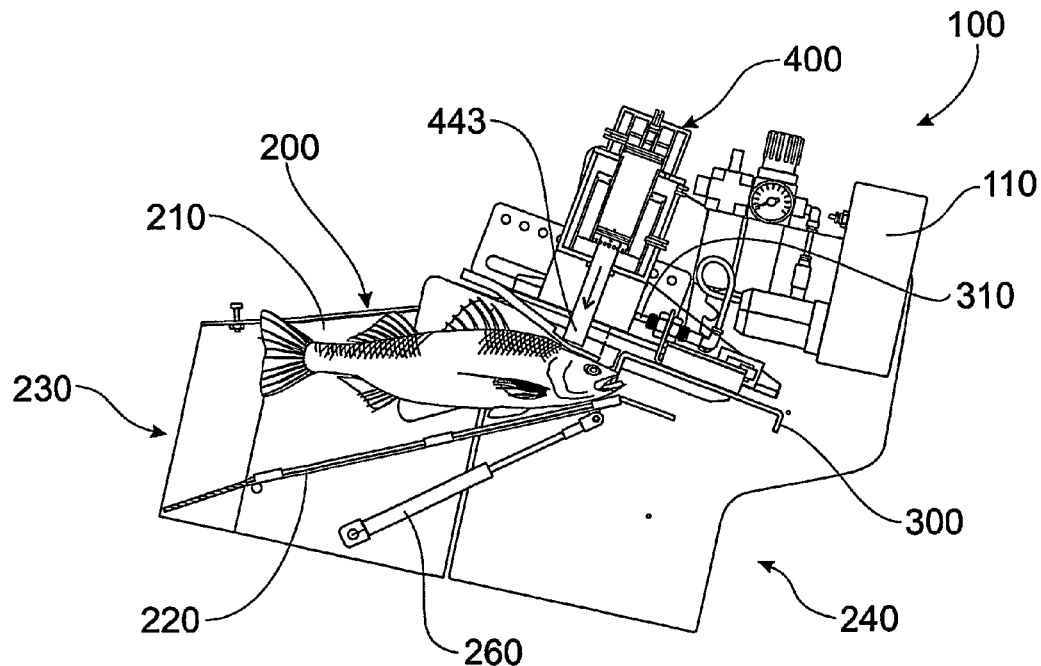
FIG. 4B is a side sectional view of the fish stunning apparatus in a second position.
Figure 4C:
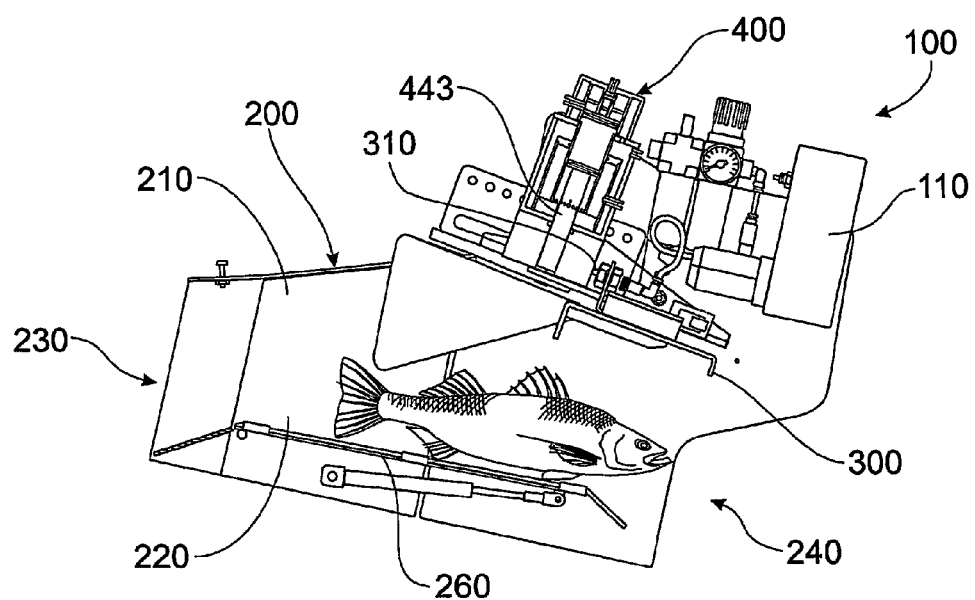
FIG. 4C is a side sectional view of the fish stunning apparatus in a third position.
Figure 4D:
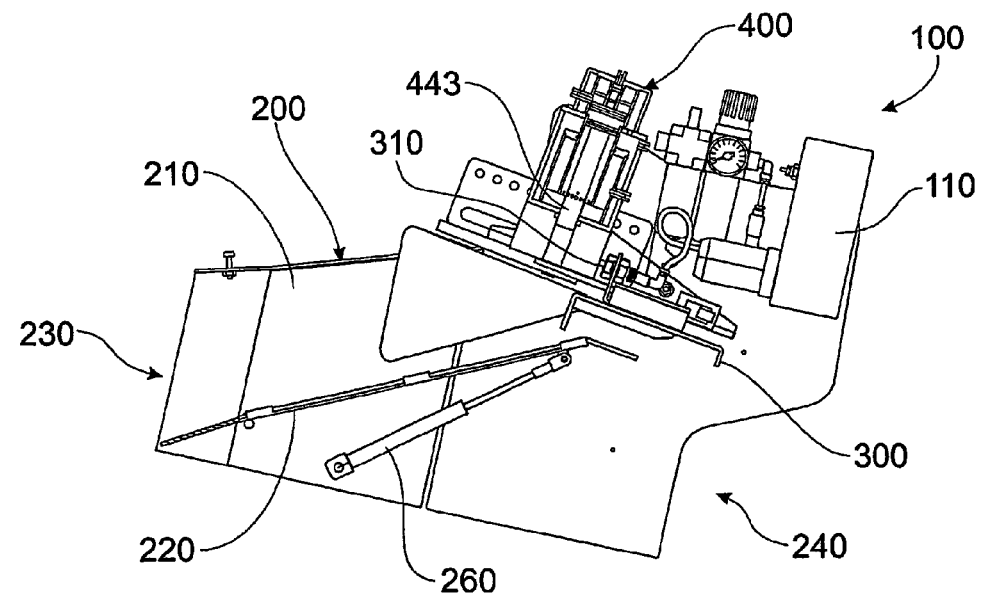
FIG. 4D is a side sectional view of the fish stunning apparatus in a fourth position.

When the piston 443 reaches the bottom of the cylinder 442, high-pressure air is passed through the control port 422 into the control chamber 421 to move the control piston valve 423 to the non-striker position as shown in FIG. 3D.

The air is feed in the low-pressure chamber 446 through low-pressure inlet port 447 and passes through the ring of holes 450 located within the cylinder 442 to cause the piston 443 to be retracted within the cylinder 442. Air located within the cylinder 442 passes through the control piston valve 423 and through the outlet 424 to complete operation of the striker.

The regulator 120 supplies air to the ports 422, 448 of the striker using standard fittings such as those sold by FESTO. A smaller regulator 290 supplies low-pressure air through the port 447. A pressure gauge 121 indicates that adequate pressure is being supplied through the regulator 120.

FIGS. 5A to 5D show a pneumatic circuit diagram showing the operation of the pneumatic rams 260 that control the operation of the floor 220. It should be appreciated that in this embodiment that the operation of the striker and the floor 220 are timed so that the floor will drop after the piston 443 has reached its extended position.

Figure 5A:
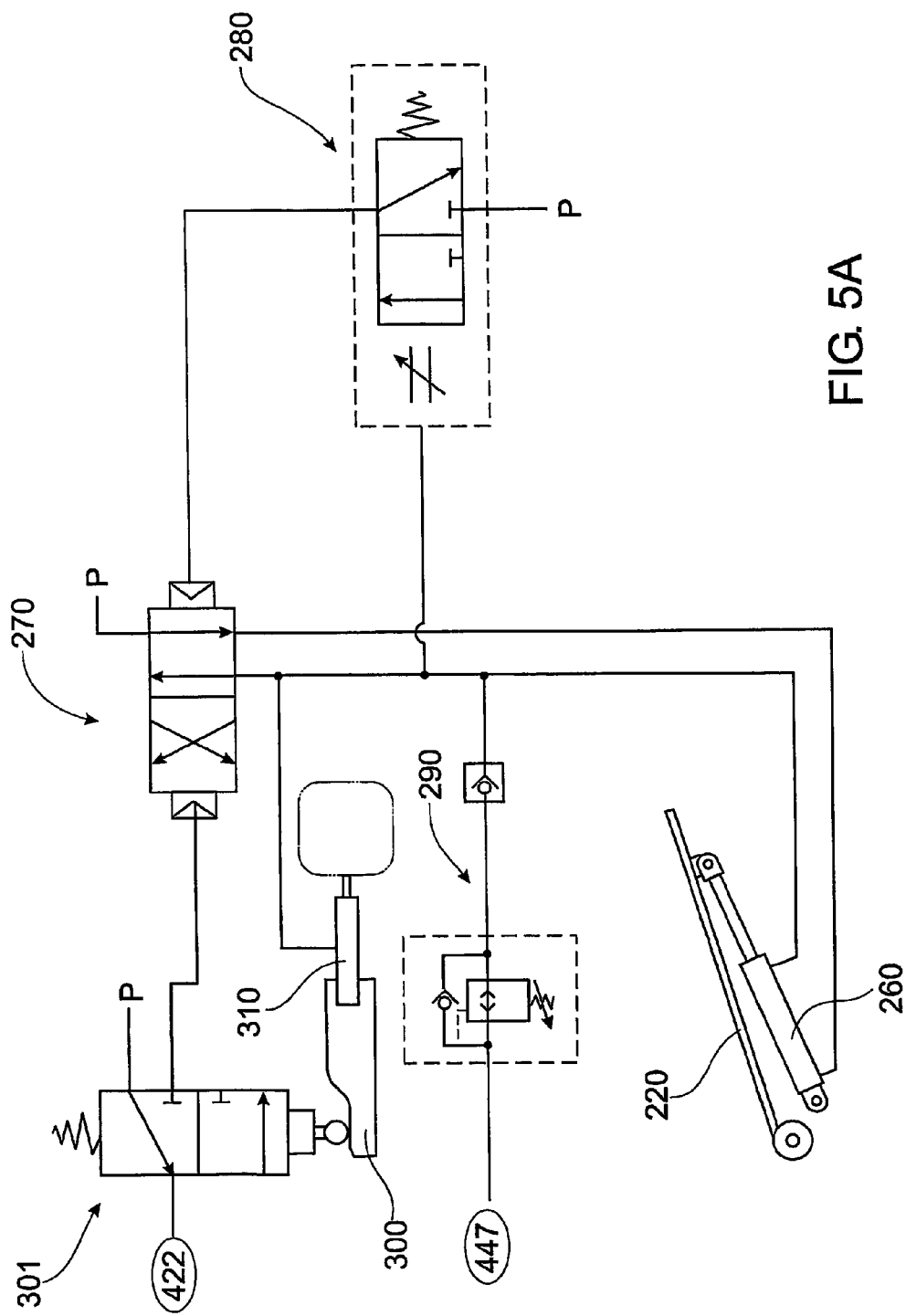
FIG. 5A is a schematic drawing of the pneumatic circuit diagram used to operate a floor of a fish guide.

The pneumatic circuit diagram shown is formed from a trigger valve 301, floor ram valve 270, timer valve 280 and regulator 290. FIG. 5A shows the pneumatic circuit diagram prior to activation of the trigger 300.

Figure 5B:
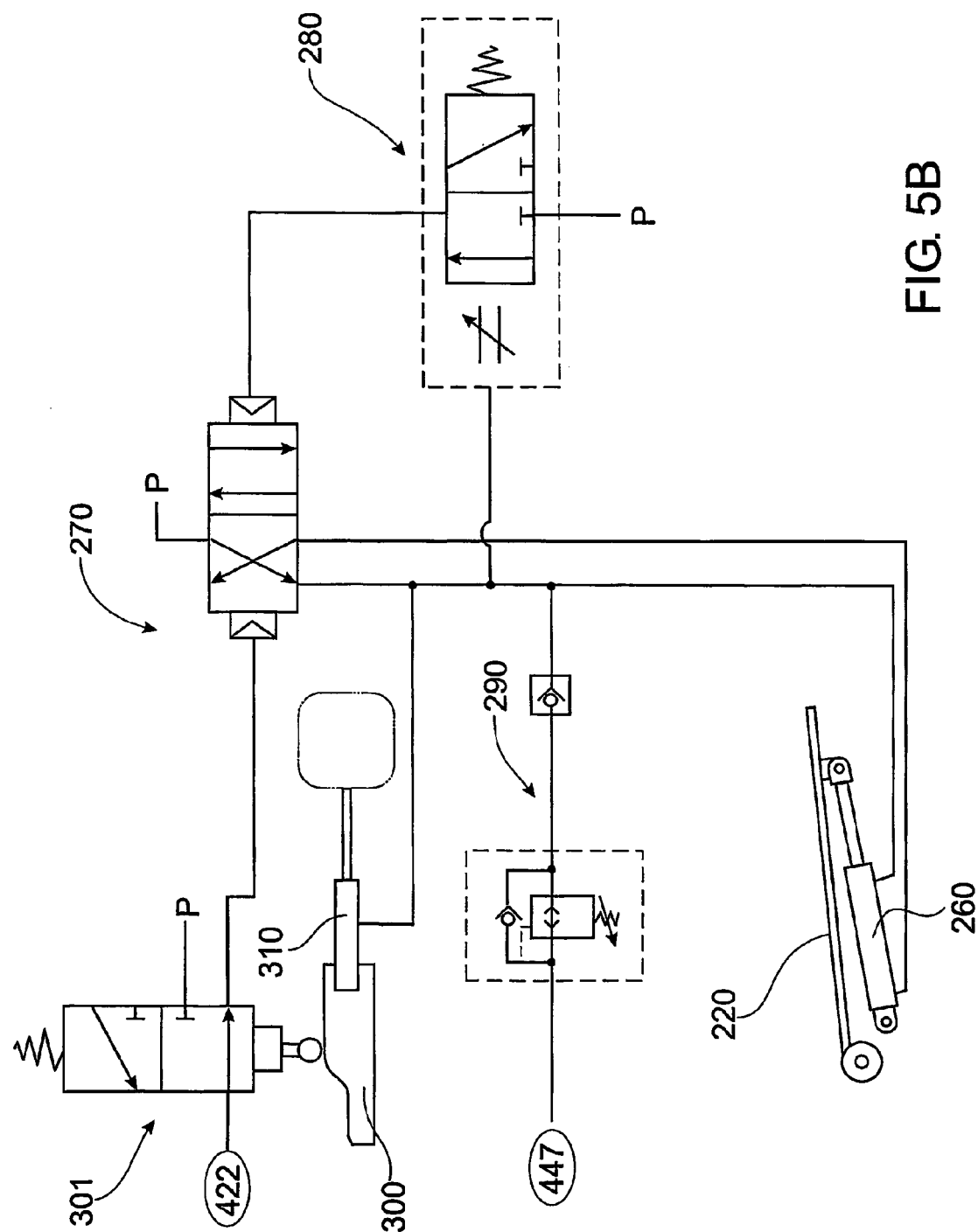
FIG. 5B is a further schematic drawing of the pneumatic circuit diagram used to operate a floor of a fish guide.

Once the trigger valve 301 is activated via the trigger valve 300, as shown in FIG. 5B, air expelled from the control chamber 421 through the control port 422 is passed through the trigger valve 301 to switch the position of ram valve 270. Air is then supplied to the pneumatic rams 260 to cause the pneumatic rams 260 to lower the floor 220. At the same time, air is used to switch on timer valve 280.

Air is also supplied to the pin pneumatic ram 310 to cause the ram to be extended. The pin pneumatic ram 310 is provided such that the trigger becomes fully retracted whenever the floor ram valve 270 is switched to lower the floor 220. In some instance, the trigger may not be fully engaged immediately. This will normally occur when a fish only lightly taps the trigger 300. This will allow sufficient air to pass from the control chamber 421 through the control port 422 to switch the position of floor ram valve 270 but will not allow the piston 443 to be extended. By providing the pin pneumatic ram 310, the piston 443 will always be moved to the extended position when the floor 220 is lowered.

Figure 5C:
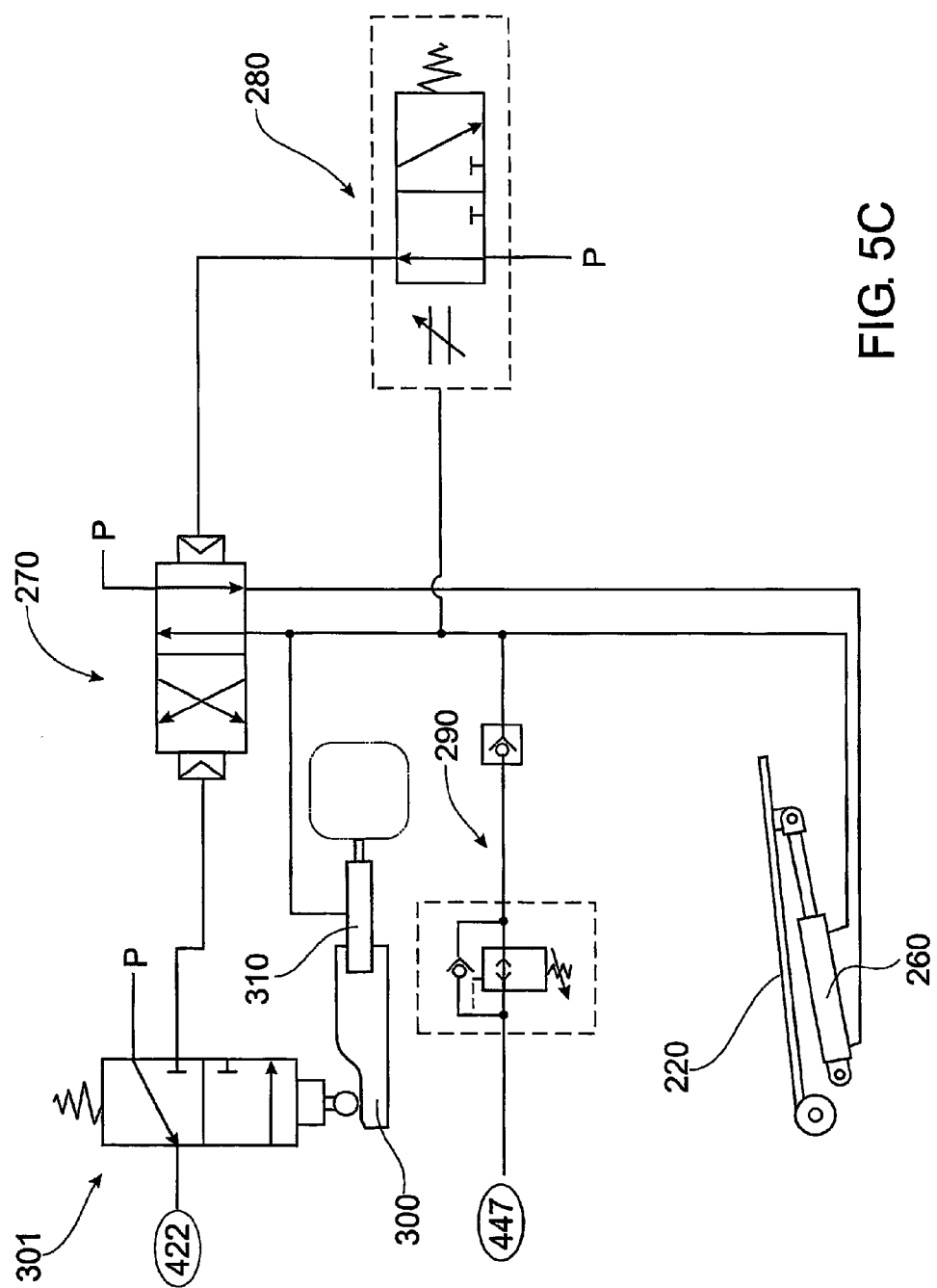
FIG. 5C is another further schematic drawing of the pneumatic circuit diagram used to operate a floor of a fish guide.

The trigger is moved back to its original position after a fish activates the trigger as shown in FIG. 5C. This causes air to pass from the pneumatic ram through the exhaust valve.

Figure 5D:
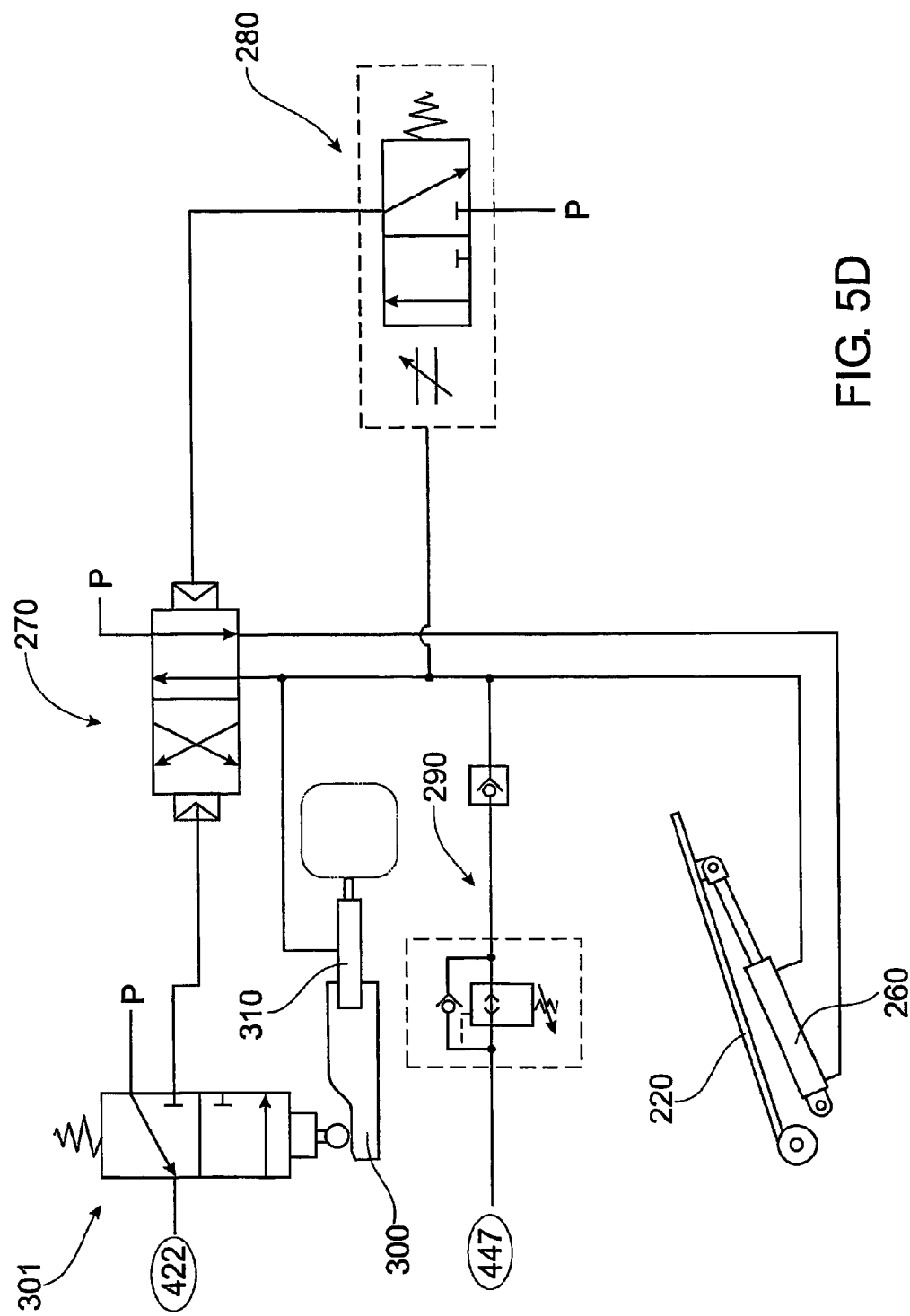
FIG. 5D is yet another further schematic drawing of the pneumatic circuit diagram used to operate a floor of a fish guide.

After a predetermined time, air is supplied through the timer valve 280 to switch the floor ram valve 220 to supply air to the pneumatic rams 260 to raise the floor 220 as shown in FIG. 5D.

FIGS. 4A to 4D shows the operating of the fish stunning apparatus 100.

The fish stunning apparatus 100 operates by a fish being placed through the entrance 230 of the guide 200. Once the fish is placed within the entrance 230, the trigger 300 is depressed and the striker 400 is activated.

The piston 443, located within the cylinder 442, moves to the extended position hitting the fish on the head, stunning the fish. After the fish has been stunned, the floor 220 moves downwardly causing the fish to pass through the exit 240 at the back of the guide 200. There is a slight delay between the piston 443 being fully extended and the floor 220 pivoting downwardly to ensure that the piston 443 stuns the fish.

The floor 220 is then moved back to its original position to allow for another fish to pass through the entrance 220 into the guide 200.

Figure 6:
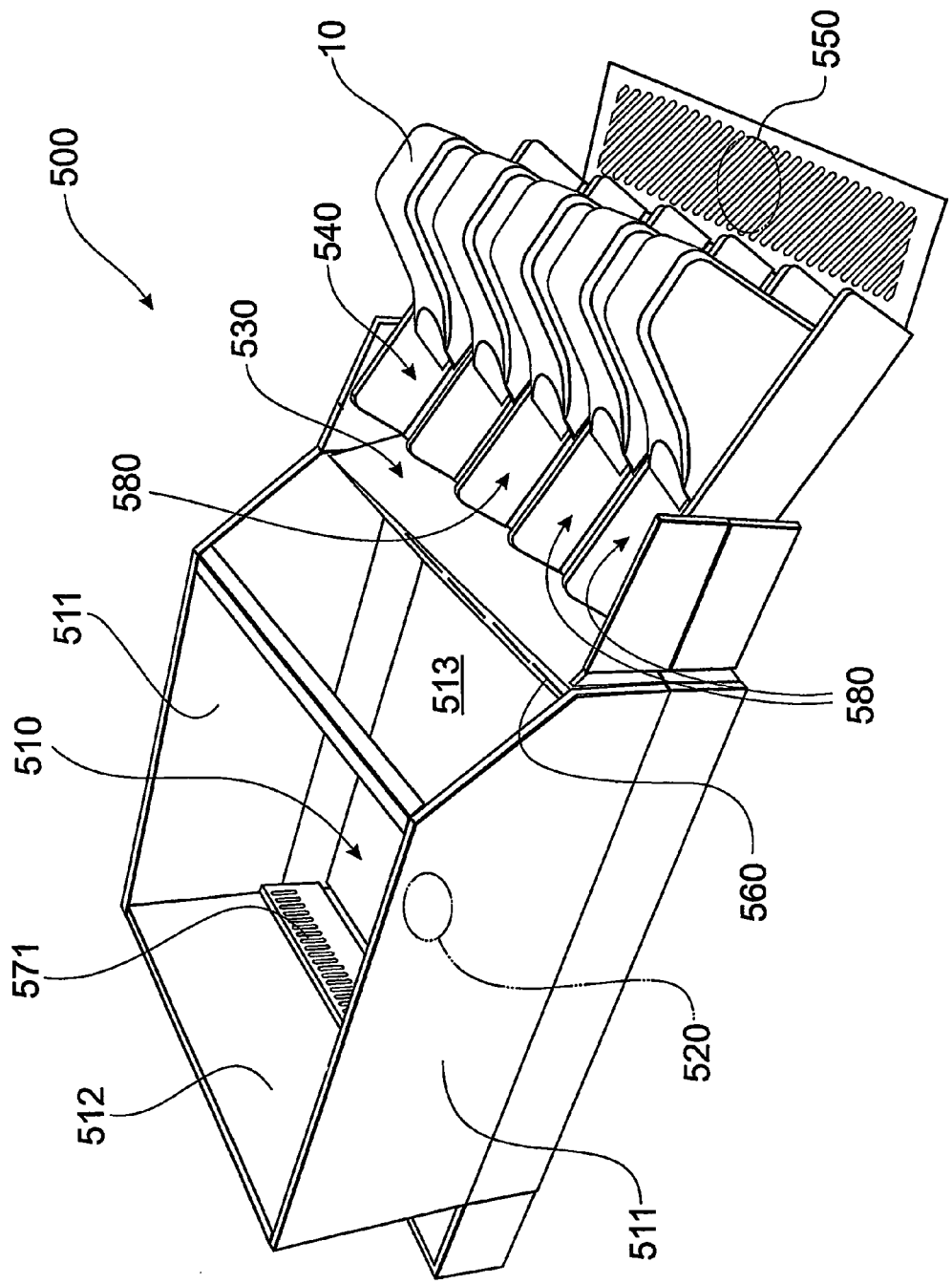
FIG. 6 is a perspective view of a table for distributing fish according to an embodiment of the invention.

FIG. 6 shows a table 500 for distributing fish for stunning. The table 500 includes a reservoir 510, an inlet 520, a weir 530, a slide 540, a drain 550 and a series of nozzles 560 that are directed outwardly from the weir 530.

Figure 7A:
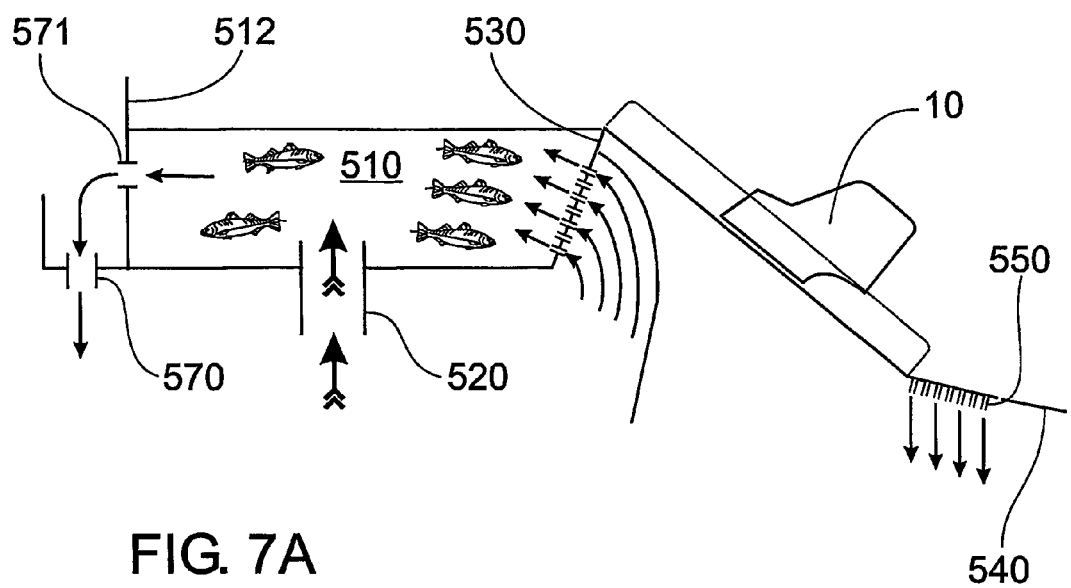
FIG. 7A is a side sectional view of the table of FIG. 6.

The reservoir 510 is formed from a pair of opposing side walls 511, an end wall 512, a base 513 and the weir 530. The reservoir 510 holds water and fish until they are ready for distribution through the stunning apparatus 10 as shown in FIG. 7A.

The inlet 520, located in the base of the reservoir 510, is used to pump fish and water into the reservoir 510.

The weir 530 is at the front of the reservoir 510 and is used to allow fish to be passed from the reservoir 510. The nozzles 560 are located along a face of the weir 560 and water is pumped through these nozzles 560 into the reservoir 510.

A slide 540 extends from the front of the weir 530 to cause the fish to slide towards the fish stunning apparatus after they pass over the weir 510. Chutes 580 ensure the fish are fed directly into the fish stunning apparatus 10. The drain 550 is located at the lower end of the slide 540 and to drain any water that passes over the weir 530.

A further drain 550 is located adjacent the end wall 512 of the reservoir 510. A grate 571 extends the length of the end wall to allow water to pass from the reservoir into the drain 570.

The table operates by pumping fish and water through the inlet 520 into the reservoir 510. Water is passed through the nozzles 560 to create an artificial current that extends away from the weir 530 towards the grate 571 in the end wall 512. The fish located within the reservoir 510 swim toward the current as is their natural tendency. Hence, the fish become aligned so that their head faces toward the weir 530.

Figure 7B:
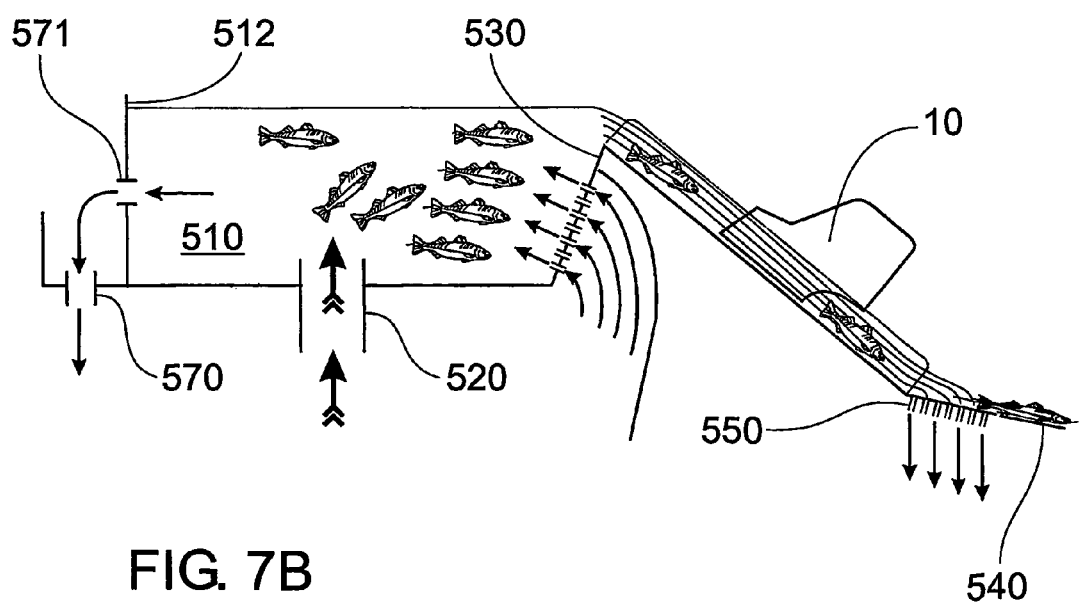
FIG. 7B is a further side sectional view of the table of FIG. 6.

Increasing the flow of water through the nozzles 560 and/or inlet then increases the level of the water located within the reservoir 510 above the weir 530 as shown in FIG. 7B. Water and fish are thus allowed to pass from the reservoir 510 over the weir 530. The water flows through the chutes 580 and the fish continue to slide down the slide 540 through fish stunning apparatus 100.

The fish flow over the weir 530 headfirst as they are facing the weir 530 prior to the level of water in the reservoir 510 being increased. As the fish travel head first over the weir 530 and down the slide, fish can be fed through the fish stunning machine automatically without the need to be fed manually.

The fish stunning apparatus 10 and table 500 provide the advantage of quick and efficient stunning of fish with minimal operator input and minimal stoppages.

It should be appreciated that various other changes and modifications may be made to the embodiments described without departing from the spirit or scope of the invention.

The invention claimed is:

1. A fish stunning apparatus comprising:
   a fish stunning device including a striker; said striker including a cylinder and a piston, said piston movable between a retracted position and an extended position;
   a fish guide having an entrance and an exit; said fish guide guiding a fish below the striker so that the piston contacts said fish when the piston is in the extended position;
   a trigger to cause the piston to be moved from the retracted position to the extended position when the fish is passed through the fish guide;
   wherein the fish guide includes a floor being pivotally movable between an first position and a second position, the floor moving from the first position to the second position to allow a fish to pass unidirectionally from the entrance to the exit.

2. The fish stunning apparatus of claim 1 wherein the fish stunning device is mounted to the fish guide using a mount.

3. The fish stunning device of claim 1 wherein the striker includes a head, a main body and a foot.

4. The fish stunning device of claim 3 wherein the main body include a low-pressure chamber that is linked to a low-pressure inlet port and a high-pressure chamber that is linked to a high-pressure inlet port.

5. The fish stunning device of claim 3 wherein the head includes a control chamber that is linked to a control port.

6. The fish stunning device of claim 5 wherein a control piston valve is mounted within the head and may be movable between a striker position and a non-striker position.

7. The fish stunning device of claim 6 wherein an outlet port is above the control piston valve to allow air to pass out of the head.

8. The fish stunning device of claim 7 wherein a passage way may extend through control piston valve to allow air to pass from the cylinder out an outlet.

9. The fish stunning device of claim 8 wherein a seal is located above the passageway to seal the passageway when the control piston valve is in the striker position.

10. The fish stunning device of claim 1 wherein the cylinder is located within the main body.

11. The fish stunning device of claim 1 the foot has an aperture through which the piston extends when in the extended position.

12. The fish stunning device of claim 1 wherein the entrance and exit may be formed by a pair of side walls.

13. The fish stunning device of claim 12 wherein the side walls are diverging.

14. The fish stunning device of claim 12 wherein the floor is pivotally movable.

15. The fish stunning device of claim 14 wherein at least one ram is used to move the floor between the first and second position.

16. The fish stunning device of claim 15 wherein the ram is pneumatically driven.

17. The fish guide of claim 15 wherein the ram is pneumatically driven.

18. The fish guide of claim 14 wherein at least one ram is used to move the floor between the first and second position.

19. The fish guide of claim 12 wherein the side walls are diverging.

20. The fish guide of claim 12 wherein the floor is pivotally movable.

21. The fish guide of claim 1 wherein the entrance and exit may be formed by a pair of side walls.

* * * * *